(12) United States Patent
Miyasaka (10) Patent No.: US 11,124,868 B2
(45) Date of Patent: Sep. 21, 2021

(54) METHOD OF SURFACE TREATMENT FOR GEAR FOR STRAIN WAVE REDUCTION GEAR MECHANISM

(71) Applicant: FUJI KIHAN CO. LTD., Nagoya (JP)

(72) Inventor: Yoshio Miyasaka, Nagoya (JP)

(73) Assignee: FUJI KIHAN CO. LTD., Nagoya (JP)

( * ) Notice: Subject to any disclaimer, the term of this patent is extended or adjusted under 35 U.S.C. 154(b) by 132 days.

(21) Appl. No.: 16/662,530

(22) Filed: Oct. 24, 2019

(65) Prior Publication Data

US 2020/0248296 A1 Aug. 6, 2020

(30) Foreign Application Priority Data

Feb. 1, 2019 (JP) .............................. JP2019-017074

(51) Int. Cl.
*C23C 8/66* (2006.01)
*C23C 8/80* (2006.01)
*F16H 55/06* (2006.01)
*F16H 49/00* (2006.01)

(52) U.S. Cl.
CPC ................ *C23C 8/66* (2013.01); *C23C 8/80* (2013.01); *F16H 55/06* (2013.01); *F16H 49/001* (2013.01)

(58) Field of Classification Search
CPC .... C23C 8/66; C23C 8/80; C21D 7/06; F16H 55/06
See application file for complete search history.

(56) References Cited

U.S. PATENT DOCUMENTS

| 8,940,109 | B2 | 1/2015 | Nagata et al. |
| 9,394,985 | B2 | 7/2016 | Kobayashi et al. |
| 9,874,273 | B2 | 1/2018 | Kobayashi et al. |
| 2015/0240930 | A1 | 2/2015 | Kobayashi et al. |
| 2018/0363750 | A1 | 12/2018 | Handa et al. |

(Continued)

FOREIGN PATENT DOCUMENTS

| CN | 101821059 A | 9/2010 |
| CN | 102803522 A | 11/2012 |
| CN | 103097774 A | 5/2013 |

(Continued)

OTHER PUBLICATIONS

Corresponding Taiwan Appl. No. 108145343, Taiwan Office Action dated Mar. 5, 2020.

(Continued)

*Primary Examiner* — Jessee R Roe
(74) *Attorney, Agent, or Firm* — Cooper Legal Group, LLC; Ronald M. Kachmarik (57) ABSTRACT

A method of treating a surface of a gear for a strain wave reduction gear mechanism. The method includes: taking a gear for a strain wave reduction gear mechanism as a workpiece, the gear is formed from a machine structural steel containing at least 0.2% carbon and being subjected to heat treatment after having been machined; performing a first process in which carbide particles are ejected against a surface of the workpiece so as to remove machining marks on the surface of the workpiece and so as to cause elemental carbon in the carbide particles to diffuse and permeate into the surface of the gear; and after the first process, performing a second process in which spherical particles are ejected against a surface of the workpiece for increasing an internal compressive residual stress of the gear surface by a magnitude of at least −50 MPa.

5 Claims, 2 Drawing Sheets

(56) References Cited

U.S. PATENT DOCUMENTS

2019/0022824 A1   1/2019  Miyasaka

FOREIGN PATENT DOCUMENTS

| | | |
|---|---|---|
| CN | 104285075 A | 1/2015 |
| CN | 106863142 A | 6/2017 |
| CN | 108884549 A | 11/2018 |
| JP | H10110790 A | 4/1998 |
| JP | 3242060 B2 | 12/2001 |
| JP | 2005002457 A | 1/2005 |
| JP | 2017-186616 A | 10/2017 |
| JP | 2017186616 A | 10/2017 |
| TW | 201542302 A | 11/2015 |
| TW | 201730450 A | 9/2017 |
| WO | 2011/122315 A1 | 10/2011 |
| WO | 2011122315 A1 | 10/2011 |

OTHER PUBLICATIONS

Corresponding European Appl. No. 19204151.5, European Search Report dated Mar. 5, 2020.
Corresponding Chinese Patent Application No. 201911218463.4, Chinese Office Action dated Jul. 1, 2020.

METHOD OF SURFACE TREATMENT FOR GEAR FOR STRAIN WAVE REDUCTION GEAR MECHANISM

BACKGROUND OF THE INVENTION

1. Field of the Disclosure

The present invention relates to a method of treating a surface of a gear employed in a strain wave reduction gear mechanism. More specifically, the present invention relates to a method of surface treatment for a gear for a strain wave reduction gear mechanism particularly suited for application to an external gear that elastically deforms during use from out of gears employed in a strain wave reduction gear mechanism.

2. Description of Related Art

Figure 1:
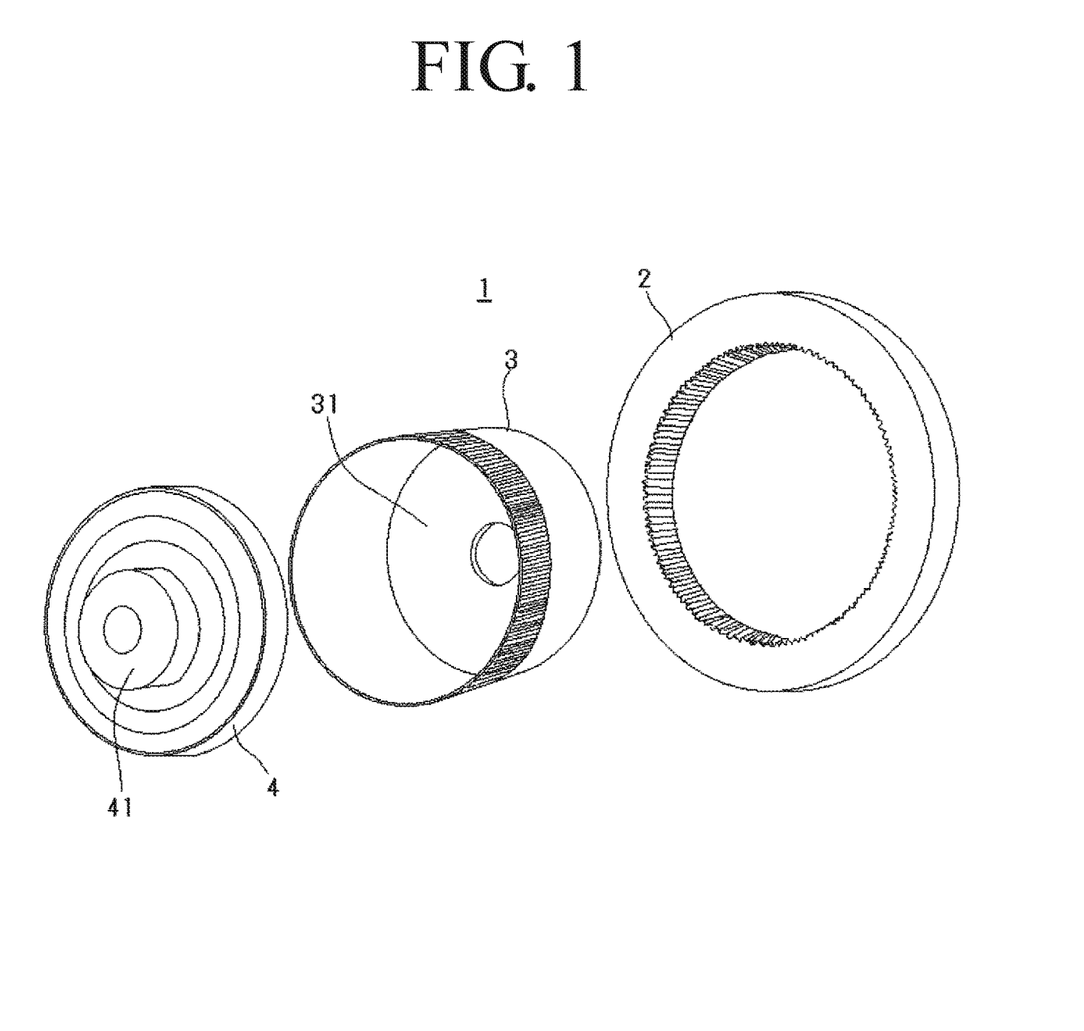
FIG. 1 is an exploded perspective view illustrating a strain wave reduction gear mechanism.
Figure 2:
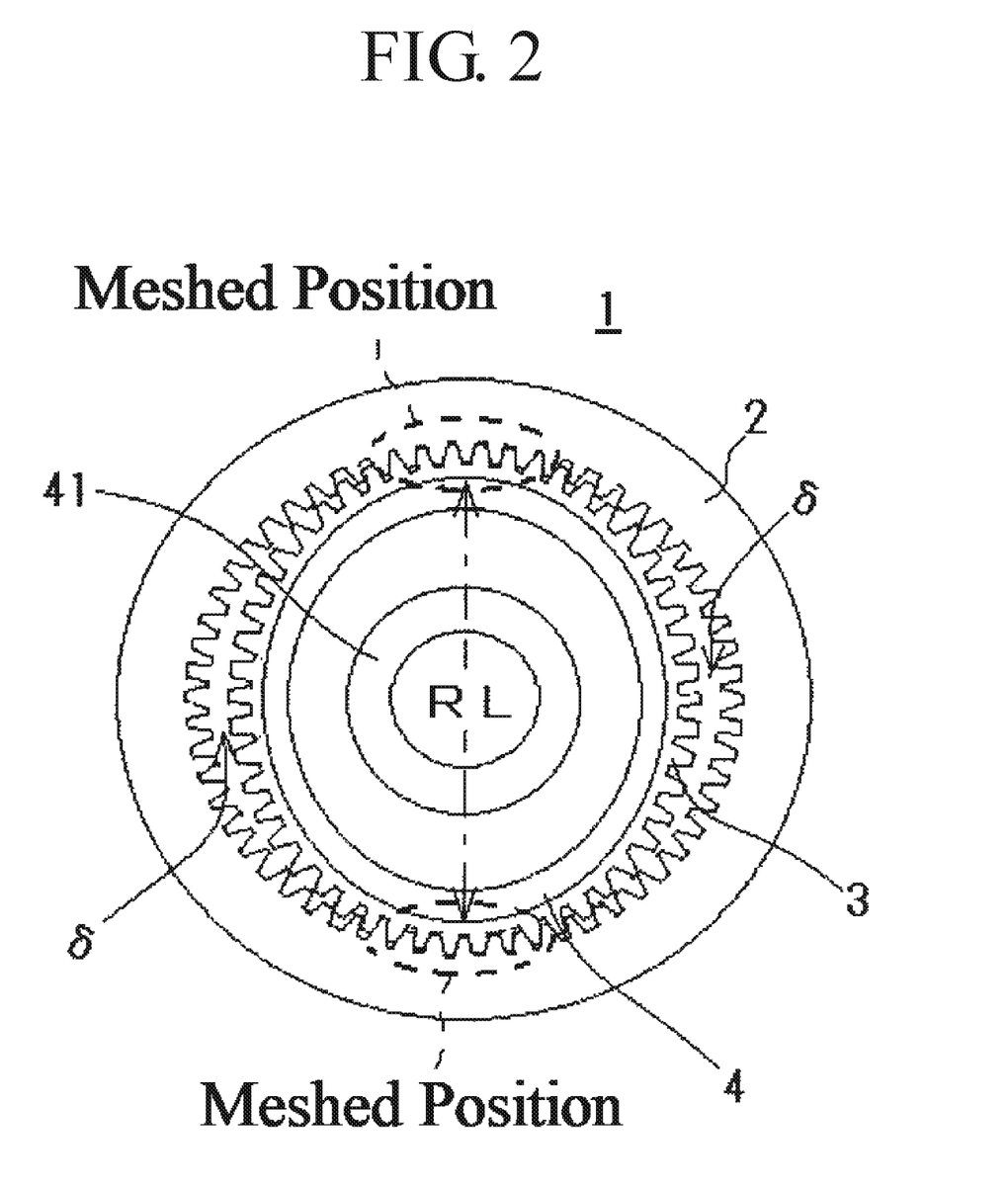
FIG. 2 is an explanatory diagram of a strain wave reduction gear mechanism.

Explanation follows regarding configuration of a strain wave reduction gear mechanism 1 subject to treatment by the surface treatment method of the present invention, with reference to FIG. 1 and FIG. 2. The strain wave reduction gear mechanism 1 includes a rigid internal gear 2 also called a circular spline, a flexible external gear 3 also called a flex spline that meshes with the internal gear 2, and an elliptical strain wave generator 4 also called a wave generator that rotates inside the external gear 3.

The external gear 3 is the component from the above that deforms so as to conform to the shape of the strain wave generator 4 inserted at the radial inside of the external gear 3. The external gear 3 meshes with the internal gear 2 only at outer peripheral positions thereof corresponding to the major axis RL of the strain wave generator 4. Other portions of the external gear 3 do not mesh with the internal gear 2, and are separated therefrom by a gap δ.

Thus when the strain wave generator 4 rotates inside the external gear 3 while one of the gears out of the internal gear 2 or the external gear 3 is fixed, the positions where the external gear 3 meshes with the internal gear 2 are moved along the rotation direction of the strain wave generator 4. While the strain wave generator 4 is making one revolution, the external gear 3 undergoes relative rotation inside the internal gear 2. The relative rotation is in the opposite direction to the rotation direction of the strain wave generator 4 and is of an amount according to the difference in the number of teeth between the internal gear 2 and the external gear 3.

Such a strain wave reduction gear mechanism 1 is normally configured with the internal gear 2 fixed, and an output shaft (not illustrated in the drawings) attached to the external gear 3 (to a diaphragm 31 provided to the external gear in the illustrated example). Such a configuration enables rotation input through an input shaft (not illustrated in the drawings) attached to a boss 41 of the strain wave generator 4 to be reduced in speed and output through the output shaft (not illustrated in the drawings) coupled to the external gear 3.

The strain wave reduction gear mechanism 1 configured as described above obtains a large speed reduction ratio while having a relatively simple structure configured from only three components, i.e. the internal gear 2, the external gear 3, and the strain wave generator 4. This facilitates a reduction in size, and so the strain wave reduction gear mechanism 1 is employed in applications requiring a compact size and a large speed reduction ratio.

Common examples of such applications include employment in drive device applications, such as the actuator of a robotic arm, the actuator for mirror control in a large optical/infrared telescope, or the like. Many such applications are cases in which a comparatively large load is being applied.

A high mechanical strength is accordingly required of the gears employed in the strain wave reduction gear mechanism 1. The external gear 3 in particular, which is formed with a thin wall so that elastic deformation occurs and which is employed in a state continually deformed by the strain wave generator 4, needs to have a high mechanical strength while retaining the ability to deform.

One method of raising the mechanical strength of the gears employed in the strain wave reduction gear mechanism 1, and in particular of the external gear 3, would be to select a material with a high mechanical strength therefor. As an example, the external gear 3 might conceivably be manufactured using a starting material with a high carbon content.

However, when cold working such as pressing or drawing is included in the gear manufacturing processes, if a material with a high carbon content and high hardness is selected as the starting material then this leads to a reduction in plastic deformability, which is required when cold working is being performed, rendering such working difficult. On the other hand, if a low carbon content is selected for the starting material so as to enable cold working, then the final finished article obtained thereby will not achieve the required mechanical strength.

WO 2011/122315 proposes a method for manufacturing an external gear in which primary forming using cold working is performed on a starting material to obtain a "blank", which is an external gear having the approximate shape of the external gear 3, and then machining is performed to cut teeth etc. into the blank and finish the external gear 3. In this method the carbon content of the starting material is limited to not more than a predetermined value so as to enable the primary forming to be performed under conditions suited to cold working. The blank obtained by the primary forming is also subjected to heat treatment in a carburizing or carbo nitriding gas atmosphere so as to enable the strength of the blank to be raised prior to the machining to cut teeth etc. (see claims 1, 5, and 7 of WO2011/122315).

Another example of a method to improve the mechanical strength of a gear for use in such a strain wave reduction gear mechanism 1 would be to perform surface treatment so as to improve the mechanical strength by coating or modifying the surfaces of a gear after finishing has been performed by machining to cut teeth etc.

An example of such surface treatment is proposed in Japanese Patent Application Laid-Open (JP-A) No. H10-110790. In this proposal shot peening is performed on at least an inner surface and an outer surface of a diaphragm 31 portion of a cylindrical external gear 3 closed off at one end side by the diaphragm 31, so as to thereby raise the strength of the external gear 3.

Note that although not related to a method of surface treatment for a gear for a strain wave reduction gear mechanism, the applicant of the present patent application has already applied for and being issued a patent for a method of carburizing treatment in which carbide particles are ejected against the surface of an article to be treated that is made from a metal material, so as to thereby diffuse elemental carbon in the carbide particles into the surface of the treated article thereby (Japanese Patent No. 3242060).

SUMMARY

As explained above, selecting a material with a high mechanical strength as a starting material enables the mechanical strength of an external gear obtained thereby to be raised.

However, in recent years the applications of such a strain wave reduction gear mechanism 1 have not been limited to application under atmospheric pressure as in the example described above. The applications thereof are expanding to employment in space or in a vacuum, such as in actuators for moving robotic arms or solar panel paddles mounted to artificial satellites, or in actuators for directional control of antennae.

It has been reported that gears are more vulnerable to wear when the strain wave reduction gear mechanism 1 is used in such a vacuum space or outer space without restricted to when used under atmospheric pressure.

When the strain wave reduction gear mechanism 1 is employed in space, in particular, such as when mounted to an artificial satellite as mentioned above, the strain wave reduction gear mechanism 1 is used in a harsh environment after being launched, by continuing to be used over a long period of time without maintenance such as the replenishment or changing of lubrication oil etc. This means that an even higher mechanical strength is demanded of the gears employed in such a strain wave reduction gear mechanism, and there is accordingly an increase in the number of cases in which the required mechanical strength cannot be obtained through selection of the starting material alone.

Thus being able to improve mechanical strength by post treatment such as surface treatment, rather than relying on increased mechanical strength through selection of the starting material alone, would be expected to result in a further improvements in strength from the combination of these two factors.

Note that the example given above of shot peening as a surface treatment method for the external gear of the strain wave reduction gear mechanism 1, is a treatment that increases the fatigue strength and the like of the external gear by micronization of the surface structure and by imparting compressive residual stress and so on thereto. Thus increasing the impact energy (ejection velocity and ejection pressure) of the shot enables even greater micronization of the surface structure to be promoted and enables the compressive residual stress imparted to be increased. This in turn enables a further increase to be achieved in the mechanical strength of the external gear.

However, as previously described, the external gear 3 employed in the strain wave reduction gear mechanism 1 is formed with a thin wall so that elastic deformation occurs. Thus raising the impact energy (ejection pressure and ejection velocity) of the shot might result in distortion and deformation, and even breakage might occur. There is accordingly a limit to the degree by which the mechanical strength of the external gear can be increased by increasing the impact energy of the shot in shot peening.

While developing an effective surface treatment method for the external gear 3 employed in the strain wave reduction gear mechanism 1, the inventors of the present invention have observed the particulars of the surfaces of external gears manufactured by machining, heat treatment, and the like. As a result, the inventors have reached the conclusion that, as described below, there is a possibility that the presence of machining marks, as well as decarburization accompanying heat treatment, might have the effect of shortening the lifespan of the external gear.

Presence of Machining Marks

Observations of external gears revealed the presence of machining marks on the surface of the external gears, such as tool marks generated when machining using a hob cutter or the like, and damage generated by irregular machining There is a possibility that such machining marks might act as the origin of fractures or cracks, shortening the lifespan of the external gear.

Decarburization

Measurements of the hardness of the surface layer of external gears to which heat treatment was performed following machining have confirmed that the hardness is reduced to lower than the hardness of the starting material as defined by JIS.

The hardness of steel is known to be reduced by decarburization, and decarburization is also known to occur due to heat treatment even at low temperatures of around 700° C. Thus, such a reduction in the hardness of the surface layer can be predicted to have been caused by decarburization of near the outermost surface layer of the external gear, which occurred due to performing heat treatment on the external gear in order to remove internal stress and the like after machining etc.

Cases have been reported in which a reduction in fatigue strength due to the occurrence of such decarburization is three or more times that of a smooth material in which decarburization does not occur. There is thus a possibility that decarburization of near the outermost surface layer due to heat treatment might shorten the lifespan of the external gear.

If a life reduction of the external gear is caused by the presence of machining marks and the occurrence of decarburization as described above, then performing surface treatment capable of removing the machining marks generated during machining and of increasing the carbon content in near the outermost surface layer where decarburization has occurred, in combination with performing the above described shot peening, would be expected to further improve the mechanical properties of the external gear and extend the lifespan thereof.

Note that gas carburization is known to be a method of increasing the carbon content in near the outermost surface layer of a steel material. WO 2011/122315 describes the inclusion of gas carburization in the processes to manufacture the external gear for a strain wave reduction gear mechanism by performing heat treatment in a carburizing atmosphere after cold working (see claims 5 and 7 of WO 2011/122315).

However, the external gear 3 of the strain wave reduction gear mechanism 1 is formed with a thin wall so as to enable elastic deformation to be induced by the strain wave generator 4. This means that gas carburization cannot be performed after machining the external gear into its final shape, since performing carburization would result in distortion or cracking occurring due to the heat accompanying such gas carburization.

Thus in the invention disclosed in WO 2011/122315, carburization is performed on the "blank" obtained by primary forming into the approximate shape of the external gear by cold working, namely by performing carburization on the "blank" prior to forming into the final shape by machining to cut teeth etc. Thus adopting such a configuration may logically be predicted to replenish any carbon content deficiency in the starting material subject to cold working, while also preventing the occurrence of strain and cracking. Thus WO 2011/122315 not only neither discloses nor suggests performing carburization on an external gear after being processed into its final shape by machining, namely, performing carburization as surface treatment, but actually negative to adopt such an approach for the carburization.

Furthermore, the configuration disclosed in WO 2011/122315 is unable to remove damage and tool marks etc. generated when machining to cut teeth etc. Since machining to cut teeth etc. is performed after carburization in this configuration, if heat treatment were subsequently performed in order to remove internal stress generated during machining then decarburization would occur as a result of such heat treatment. This configuration is accordingly not able to eliminate any of the causes of diminished lifespan predicted by the inventors of the present invention.

In order to solve the deficiencies of the related technology described above, an object of the present invention is to propose a method of surface treatment capable of improving the mechanical strength of a gear for a strain wave reduction gear mechanism.

In order to achieve the object, a method of treating a surface of a gear for a strain wave reduction gear mechanism according to the present invention comprises:

taking a gear for a strain wave reduction gear mechanism as an object to be treated, the gear being formed from a machine structural steel containing at least 0.2% carbon and being subjected to heat treatment after having been machined;

performing a first process in which carbide particles with a particle diameter of from 220 grit to 3000 grit particle size are ejected against a surface of the object to be treated at an ejection velocity of at least 50 m/sec or at an ejection pressure of at least 0.1 MPa so as to remove machining marks generated on the surface of the object to be treated during the machining and so as to cause elemental carbon in the carbide particles to diffuse and permeate into the surface of the gear; and after the first process, performing a second process in which spherical particles are ejected against a surface of the object to be treated at an ejection pressure of at least 0.2 MPa so as to increase an internal compressive residual stress of the gear surface by a magnitude of at least −50 MPa, the spherical particles having a hardness equivalent to or greater than that of the object to be treated and a particle size of not more than 220 grit.

Note that the "particle sizes" as expressed by grit number for the carbide particles and spherical particles in the present invention each correspond to particle sizes for abrasive materials as defined by JIS R6001 (1987) described in Table 1 and Table 2 below.

TABLE 1

Particle Sizes of "Coarse Powder" abrasives (JIS R 6001 1987)

| Sieve opening | | Grit Number |
|---|---|---|
| mm | μm | |
| 2.00 | | |
| 1.70 | | #12 |
| 1.40 | | #14 |
| 1.18 | | #16 |
| 1.00 | | #20 |
| | 850 | |
| | 710 | #24 |
| | 600 | #30 |

TABLE 1-continued

Particle Sizes of "Coarse Powder" abrasives (JIS R 6001 1987)

| Sieve opening | | Grit Number |
|---|---|---|
| mm | μm | |
| | 500 | #36 |
| | 425 | |
| | 355 | #46 |
| | 300 | #54 |
| | 250 | #60 |
| | 212 | #70 |
| | 180 | #80 |
| | 150 | #90 |
| | 125 | #100 |
| | 106 | #120 |
| | 90 | |
| | 75 | #150 |
| | 63 | #180 |
| | 53 | #220 |

TABLE 2

Particle Sizes of "Fine Powder" abrasives (JIS R 6001 1987) (Unit: μm)

| Grit No. | Average particle diameter | Maximum particle diameter | Particle diameter at 3% cumulative height | Particle diameter at 50% cumulative height | Particle diameter at 94% cumulative height |
|---|---|---|---|---|---|
| #240 | 88 to 74 | 127 or less | 103 or less | 57.0 ± 3.0 | 40 or more |
| #280 | | 112 | 87 | 48.0 ± 3.0 | 33 |
| #320 | | 98 | 74 | 40.0 ± 2.5 | 27 |
| #360 | | 86 | 66 | 35.0 ± 2.0 | 23 |
| #400 | 44 to 37 | 75 | 58 | 30.0 ± 2.0 | 20 |
| #500 | | 63 | 50 | 25.0 ± 2.0 | 16 |
| #600 | 31 to 26 | 53 | 43 | 20.0 ± 1.5 | 13 |
| #700 | | 45 | 37 | 17.0 ± 1.3 | 11 |
| #800 | 22 to 18 | 38 | 31 | 14.0 ± 1.0 | 9.0 |
| #1000 | 18 to 14.5 | 32 | 27 | 11.5 ± 1.0 | 7.0 |
| #1200 | | 27 | 23 | 9.5 ± 0.8 | 5.5 |
| #1500 | | 23 | 20 | 8.0 ± 0.6 | 4.5 |
| #2000 | 8.9 to 7.1 | 19 | 17 | 6.7 ± 0.6 | 4.0 |
| #2500 | | 16 | 14 | 5.5 ± 0.5 | 3.0 |
| #3000 | | 13 | 11 | 4.0 ± 0.5 | 2.0 |
| #4000 | 4.5 to 3.1 | 11 | 8.0 | 3.0 ± 0.4 | 1.3 |
| #6000 | | 8.0 | 5.0 | 2.0 ± 0.4 | 0.8 |
| #8000 | 2 to 1.5 | 6.0 | 3.5 | 1.2 ± 0.3 | 0.6(1) |

Note
(1) Particle diameter at 75% cumulative height (dμ- 75value)
※ A method for testing grits of "Fine Powder" abrasives is based on an electrical resistance test method of JISR6002 (Method for testing grits of abrasives).

It is preferable to use SiC or α-SiC as the carbide particles employed in the first process.

Furthermore, the surface treatment method of the present invention is suitable to treat an external gear for a strain wave reduction gear mechanism as the object to be treated.

Due to having the configuration described above, the method of surface treatment of the present invention is capable of obtaining the following remarkable effects.

A dramatic extension of the lifespan of a gear for a strain wave reduction gear mechanism can be achieved by using comparatively simple processing of employing a known blasting device to eject the carbide particles (a first process) and to eject the spherical particles (a second process).

Moreover, a strain wave reduction gear mechanism that incorporates a gear subjected to the surface treatment of the method of the present invention is able to achieve a quieter operation noise, contributing to a noise muffling effect for the strain wave reduction gear mechanism as a whole.

In particular, application of the surface treatment method of the present invention to an external gear for a strain wave reduction gear mechanism enables surface treatment to be performed that increases lifespan and achieves a noise muffling effect, without causing distortion, deformation, or breakage etc. of the thin walled external gear.

BRIEF DESCRIPTION OF DRAWINGS

The foregoing and other aspects of the present disclosure will become apparent to those skilled in the art to which the present disclosure relates upon reading the following description with reference to the accompanying drawings, in which.

DETAILED DESCRIPTION

Explanation follows regarding a surface treatment method of the present invention.

Object to be Treated

The object to be treated of the surface treatment method of the present invention is a configuration member of the strain wave reduction gear mechanism 1 as explained above with reference to FIG. 1 and FIG. 2, i.e. the internal gear 2, the external gear 3, and/or the strain wave generator 4. The surface treatment method is particularly suited to surface treatment of the external gear 3, which is formed with a thin wall so as to enable elastic deformation to occur.

The gears of the strain wave reduction gear mechanism that are object to be treated of the surface treatment method of the present invention are manufactured from a machine structural steel containing at least 0.2% carbon. Generally, machine structural steel also called engineering steel contains either nickel, chromium, molybdenum or carbon, or combinations thereof, including carbon, alloy or free cutting steel providing high strength, toughness, fatigue strength and hardenability. The material is used to make critical parts of automobiles, construction machinery and industrial machinery. Examples of steels that may be employed as such machine structural steels include SCM435H, SCM440H, and SNCM439, although there is no limitation thereto.

Prior to performing the surface treatment method of the present invention on the gear of the strain wave reduction gear mechanism that is the object to be treated, the gear is processed by machining into the finished product profile by performing machining to cut teeth etc. therein, and the internal stress, strain wave, and the like induced therein by the machining is removed in advance of the surface treatment by subjecting the gear to heat treatment after the machining Surface Treatment First Process In the present process (a first process), carbide particles are ejected by dry ejection against the surface of the object to be treated. Machining marks generated on the surface of the object to be treated by the machining performed during manufacture of the object to be treated, such as damage, directional machining marks, polishing marks, and tool marks generated by irregular machining, are removed so as to prepare the surface. In addition thereto, elemental carbon in the carbide particles is caused to diffuse and permeate into the surface of the object to be treated so as to perform carburization at normal temperature to replenish carbon in near the outermost surface layer that was lost by decarburization during the heat treatment.

Examples of carbide particles that may be employed include particles of various carbides, such as $B_4C$, SiC ($\alpha$-SiC), TiC, VC, graphite, diamond, and the like. SiC is preferably employed therefor, and $\alpha$-SiC is more preferably employed therefor.

For example, angular particles are employed as the carbide particles in order to exhibit a machining force capable of removing such machining marks, including damage, tool marks, and the like generated by irregular machining, by removal within a comparatively short period of time.

Such angular carbide particles can be obtained, for example, by crushing a sintered carbide based ceramic and then sieving the resultant particles.

In order to achieve the ejection velocity needed to obtain diffusion and permeation of the elemental carbon, the particle diameter of the particles employed is a particle diameter corresponding to a particle size distribution between 220 grit to 3000 grit particle size ("grit" herein means as defined by JIS R6001 1987). Preferably a so-called "fine powder" having a particle diameter not larger than a 240 grit particle size is employed therefor.

Various known blasting devices capable of ejecting particles by dry ejection may be employed as the method for ejecting such carbide particles onto the object to be treated. An air blasting device is preferably employed therefor due to the comparative ease of adjustment in ejection velocity and ejection pressure.

There are various types of such air blasting device, including direct pressure blasting devices, gravity suction blasting devices, and various other types of blasting device. Any of these types of blasting device may be employed, and the type thereof is not particularly limited as long as the blasting device has the performance capable of ejecting such carbide particles by dry ejection at an ejection velocity of at least 50 m/sec, or at an ejection pressure of at least 0.1 MPa.

When such carbide particles are ejected by dry ejection against the surface of the object to be treated at an ejection velocity of at least 50 m/sec or at an ejection pressure of at least 0.1 MPa using such a blasting device, machining marks generated during machining, such as damage, tool marks, and the like generated by irregular machining, are removed so as to prepare a non-directional surface on the object to be treated.

Moreover, a localized rise in temperature is induced on the surface object to be treated by the impact of the carbide particles against the surface being treated, with the rise in temperature occurring at the portions thereof impacted by the carbide particles. The carbide particles are also heated thereby and undergo thermal decomposition so that the elemental carbon in the carbide of the carbide particles diffuses and permeates into the surface of the object to be treated. The carbon content of these portions accordingly increases, thereby replenishing carbon in the vicinity of the surface that was decarburized as a result of the heat treatment performed after the machining described above.

Performing the pre-processing (the first process) of the present invention results in the carbide particles undergo thermal decomposition due to the temperature of the carbide particles rising when the carbide particles are caused to impact the object to be treated by blasting in this manner. The elemental carbon from within the carbide particles that is generated by this decomposition accordingly diffuses and permeates into the object to be treated so as to perform carburizing treatment.

Any decarburization that accordingly occurs accompanying such heat treatment occurs in near the outermost surface layer of the object to be treated, and decarburization does not occur at the inside of the object to be treated. The diffusion and permeation of elemental carbon into the object to be treated by the method of the present invention is accordingly most significant in near the outermost surface layer and results in a large increase in the carbon content thereat. The increase in carbon content by such diffusion, and thus the carbon content itself, gradually decreases toward the inside of the object to be treated, resulting in a graded structure in which the carbon content decreases with depth from the surface of the object to be treated until reaching the carbon content of an untreated state at a certain depth. A suitable increase can accordingly be achieved in the carbon content in near the outermost surface layer where the carbon content was reduced by decarburization as described above.

Although a rise in temperature is accordingly induced in the carbide particles and at parts of the object to be treated when the carbide particles impact the object to be treated, such a rise in temperature is localized and momentary. This means that distortion, deformation, or the like do not occur in the object to be treated, as would be caused by heat treatment in typical carburizing treatment performed by heating the entire object to be treated in a carburizing furnace, thereby enabling treatment to be performed on the thin walled external gear for a strain wave reduction gear mechanism.

Moreover, high adhesion strength is achieved by this method due to the generation of fine carbides, and an irregular shaped carburized layer is not generated.

In order to explain more precisely the principles of elemental carbon diffusion and permeation by such blasting, the following explanation is a comparison to an example of typical gas carburizing treatment. A typical gas carburizing method employs as a carburizing atmosphere gas feedstock a hydrocarbon gas, such as methane ($CH_4$), propane ($C_3H_8$), or butane ($C_4H_{10}$), that has been mixed with air at a certain ratio.

Carbon monoxide (CO), hydrogen ($H_2$), and nitrogen ($N_2$) are generated by an endothermic reaction when such a gas mixture is heated. Carburizing is mainly performed by CO gas undergoing thermal dissociation to generate activated carbon as expressed by the following equation, and by the activated carbon reacting with Fe in the steel.

$$2CO=C+CO_2$$

Namely, although a reaction between the Fe in the steel and CO gas cannot be induced merely by physically attaching CO gas to a steel base metal surface, since the CO gas would be easily removable by simple application of an external force, heating, or some other physical method, the CO gas is actively adsorbed onto the surface of the Fe by imparting additional heat or other energy of a certain amount or greater. The carburizing phenomenon is thought to result from the CO gas that has been actively adsorbed thereon then undergoing thermal dissociation into carbon dioxide and carbon, and the activated carbon generated by such a reaction being heated to about 1000° C. and diffusing into an Fe lattice in steel that adopts a face centered cubic γ structure, which enables C to form a solid solution.

In such gas carburizing treatment, due to the Fe in the steel adopting such a face centered cubic γ structure enabling C to form a solid solution, carbon readily diffuses and permeates into the object to be treated due to uniform heating of the object to be treated, i.e. the whole steel body. Although it depends on conditions, the thickness of the carburized layer is comparatively thick at about 1 mm to about 1.5 mm, and it is difficult to form a graded structure in which the increase in carbon content gradually decreases on progression inwards, such as is achieved by performing pre-processing (the first process) on the base metal as in the present invention.

In consideration of the phenomena that occurs in such conventional gas carburizing treatment, the first process of the present invention may be thought of as being a carbon diffusion phenomenon as described below.

Carbide particles are ejected against the surface of an object to be treated formed from machine structural steel, and when they have impacted the base metal surface of the object to be treated they then rebound, but with a slower velocity after impact. The ratio of velocities pre-impact and post-impact, namely the coefficient of restitution, differs according to the substance and hardness of the object to be treated, and the kinetic energy lost thereby is, other than noise, mainly converted into heat energy under the law of conservation of energy. Heat energy may be thought of as being internal friction arising from deformation that occurs at the impacted portions of the object to be treated when impacted. However, heat exchange only occurs at deforming portions of the object to be treated impacted by the carbide particles ejected at normal temperature. A high temperature is accordingly generated at parts of the surface of the object to be treated impacted by the carbide particles.

Moreover, these impacted portions only have an extremely small surface area that corresponds to the particle diameter, and so these impacted portions undergo repeated rapid heating and rapid cooling. It is thought that when this occurs, the carbide particle side undergoes thermal decomposition due to also being heated at the surface of the object to be treated, and activated carbon in the carbide particles is actively adsorbed onto the object to be treated, and diffuses therein.

However, in the first process of the present invention, the object to be treated is not uniformly heated as in typical carburizing. Although parts of the object to be treated are heated by impact of the carbide particles, this heating occurs in a localized manner at the portions on the surface impacted by the carbide particles. The effect of the heat generated by the impact accordingly rapidly decreases on progression toward the inside of the object to be treated. In the first process according to the method of the present invention, the diffusion of carbon consequently becomes more difficult on progression inwards from the surface of the object to be treated. This is thought to result in the carbon content decreasing on progression toward the inside, so as to perform carburizing in a manner that generates the graded structure described above.

Moreover, the carbide particles employed in the present invention are made from one of the carbides described above. These carbides generally have a low density compared to metals (for example, SiC: 3.2 $g/cm^3$; $B_4C$: 2.5 $g/cm^3$), and so even if they are ejected at high speed against the object to be treated there is little deformation at impact. The present invention accordingly enables carburizing treatment to be performed with little deformation of the object to be treated compared to conventional gas carburizing treatment methods and the like in which the entire object to be treated needs to be heated to a high temperature. The treatment can also be performed without causing breakage, deformation, or the like even in cases in which the present invention is applied to an external gear formed with a thin wall for a strain wave reduction gear mechanism.

Second Process

In the present process (a second process), spherical particles are ejected by dry ejection against the surface of the object to be treated after the treatment of the first process has been performed thereon, such that internal compressive residual stress at the surface of the object to be treated is increased by a magnitude of at least −50 MPa.

There are no particular limitations to the substance of the spherical particles employed therefor, as long as the spherical particles have a hardness that is not less than that of the object to be treated. For example, as well as spherical particles made from various metals, spherical particles made from a ceramic may be employed, and spherical particles made from a similar substance to the carbide particles (i.e. a carbide) may also be employed therefor.

The ejected particles are employed in order to obtain a shot peening effect, in which compressive residual stress is imparted to the surface of the object to be treated as described above, and so spherical shapes (spherical particles) are employed therefor.

Note that in the present invention, "spherical" need not refer strictly to a "sphere", and includes a wide range of non-angular rounded shapes, such as spheroid shapes or barrel shapes.

Such spherical particles can be obtained by atomizing methods when the substance of the particles is a metal, and can be obtained by crushing and then melting when the substance of the particles is a ceramic. The particle diameter of the particles employed is therefore a particle diameter corresponding to not larger than 220 grit in a particle size distribution as defined by JIS R6001 (1987), and a "fine powder" having a particle diameter not larger than that of 240 grit is preferably employed therefor.

Moreover, various known blasting devices with dry ejection capabilities, similar to those described with respect to the ejection method for carbide particles when explaining the first process, may be employed as the method for ejecting the spherical particles against the surface of the object to be treated. The type and so on of the blasting device is not particularly limited, as long as it has performance capable of ejecting at an ejection pressure of at least 0.2 MPa.

The spherical particles described above are ejected by such a blasting device against the surface of the object to be treated after the treatment of the first process has been completed thereon.

Due to the impact of the spherical particles, plastic deformation occurs on the surface of the object to be treated at the portions impacted by the spherical particles. The surface roughness is thereby improved by the indentations and protrusions with acute apexes formed on the surface of the object to be treated in the cutting being collapsed by the impact of the angular carbide particles in the pre-processing (the first) process, and by innumerable depressions (dimples) with circular arc shapes being randomly formed over the entire surface of the object to be treated thereby.

Moreover, due to the heat generated by the impact of the spherical particles, the impacted portions experience momentary local heating and cooling. Accompanying this momentary heat treatment, fine crystals are also formed at the surface of the object to be treated and the treated surface undergoes work hardening due to the plastic deformation when the circular arc shape depressions are formed. The surface hardness of the object to be treated is thereby further increased from that in the state after the first process. Moreover, due to compressive residual stress being imparted by the plastic deformation of the surface, this is also thought at the same time to contribute to an increase in the fatigue strength and the like of the object to be treated, due to an effect obtained by what is called "shot peening". This enables the internal compressive residual stress of the surface of the object to be treated to be increased by a magnitude of at least −50 MPa compared to the internal compressive residual stress after the first process.

Operation, etc.

Performing surface treatment on the gear of a strain wave reduction gear mechanism using the method of the present invention as described above not only enables the lifespan of the gear on which the surface treatment has been performed to be greatly extended, but also enables a reduction in operation noise of the strain wave reduction gear mechanism to be achieved so as to enable a muffling effect to be obtained.

Moreover, ejecting the carbide particles and the spherical particles under the treatment conditions described above enables the mechanical strength to be improved without inducing distortion, deformation, breakage, or the like to occur, even in cases in which the object to be treated is an external gear having a thin walled structure for a strain wave reduction gear mechanism.

EXAMPLES

Purpose of Testing

The differences in the respective surface states of external gears employed in strain wave reduction gear mechanisms formed from different materials were confirmed for: cases in which the external gears are subjected to surface treatment using the method of the present invention (the first process and the second process); for cases in which the external gears are subjected to shot peening alone, corresponding to the second process of the present invention; and for untreated cases.

Treatment Conditions

Object to be Treated

External gears for a strain wave reduction gear mechanism (respective heat treated articles with a diameter of ϕ60 mm) were prepared as the object to be treated. The external gears were made from SCM435H (carbon content 0.32% to 0.39%), SCM440H (carbon content 0.37% to 0.44%), and SNCM439 (carbon content 0.36% to 0.47%).

Ejection Conditions

Particle ejection conditions are given in Table 3 below.

TABLE 3

| | | First Process | Second Process |
|---|---|---|---|
| Ejection conditions | Blasting device | SCF-4A made by Fuji Manufacturing Co., Ltd. | SGF-4A made by Fuji Manufacturing Co., Ltd. |
| | Ejected particles | 400 grit SiC | 400 grit high-speed steel |
| | Ejection pressure | 0.3 MPa | 0.5 MPa |
| | Ejection nozzle diameter | ϕ 9 mm | long nozzle of ϕ 9 mm |
| | Ejection distance | 150 mm | 150 mm |
| | Ejection duration | Workpiece rotated at 12 | Workpiece rotated at 12 min$^{-1}$ |

TABLE 3-continued

| | First Process | Second Process |
|---|---|---|
| | min$^{-1}$ and nozzle oscillated for 20 seconds | and nozzle oscillated for 20 seconds |

Material and Treatment Regime of Examples and Comparative Examples

Material and treatment regime of the respective examples (Examples 1 to 3) and comparative examples (Comparative Examples 1 to 6) are listed in Table 4 below.

TABLE 4

Material and treatment regime of the respective examples (Examples 1 to 3) and comparative examples (Comparative Examples 1 to 6)

| Example/ Comparative Example | Material of object to be treated | Treatment Regime |
|---|---|---|
| Example 1 | SCM435H | Both first process and second process of Table 3 (treatment of the present invention) |
| Example 2 | SCM440H | |
| Example 3 | SNCM439 | |
| Comparative Example 1 | SCM435H | Second process of Table 3 alone |
| Comparative Example 2 | SCM440H | |
| Comparative Example 3 | SNCM439 | |
| Comparative Example 4 | SCM435H | Not treated |
| Comparative Example 5 | SCM440H | |
| Comparative Example 6 | SNCM439 | |

Test Results

The surface states listed in Table 5 below are for respective articles that have been subjected to the surface treatment of the present invention (Examples 1 to 3), that have been subjected to the second process alone (Comparative Examples 1 to 3), or that remain untreated (Comparative Examples 4 to 6).

TABLE 5

Test Results

| Object to be treated | | Hardness of surface layer | Compressive stress of surface layer |
|---|---|---|---|
| SCM435H (HB269 to 331) [JISG4105 (1979)] | Example 1 (first process and second process) | HV 350 (HB336) | −580 MPa |
| | Comparative Example 1 (second process alone) | HV 300 (HB286) | −480 MPa |
| | Comparative Example 4 (not treated) | HV 250 (HB237) | −190 MPa |
| SCM440H (HB285 to 352) [JISG4105 (1979)] | Example 2 (first process and second process) | HV 390 (HB371) | −620 MPa |
| | Comparative Example 2 (second process alone) | HV 340 (HB325) | −540 MPa |
| | Comparative Example 5 (untreated) | HV 280 (HB264) | −200 MPa |
| SNCM439 (HB293 to 352) [JISG4103 (1979)] | Example 3 (first process and second process) | HV 376 (HB367) | −600 MPa |
| | Comparative Example 3 (second process alone) | HV 320 (HB301) | −540 MPa |
| | Comparative Example 6 (untreated) | HV 270 (HB258) | −200 MPa |

NB: the HB hardness values in parenthesis in the "Hardness of surface layer" column are values approximating to the HV hardness values.

In the above results, the surface hardness of all the untreated articles (Comparative Examples 4 to 6) was lower than the hardness of the starting materials as defined by JIS. The external gears of Examples 1 to 3 subjected to surface treatment using the method of the present invention not only exhibited an increase in surface hardness of HV100 to HV110 and an increase in compressive residual stress of a magnitude of −390 MPa to −420 MPa compared to the untreated articles (Comparative Examples 4 to 6), but also exhibited a large increase in surface hardness compared to the hardness of the starting materials as defined by JIS.

Achievement of an increase in surface hardness of HV50 to HV56 and an increase in compressive residual stress of a magnitude of −60 MPa to −100 MPa was also confirmed compared to cases in which the second process was performed alone (Comparative Examples 1 to 3).

Thus the external gears subjected to the surface treatment of the present invention (Examples 1 to 3) enable a greatly extended lifespan to be achieved not only when compared to untreated articles (Comparative Examples 4 to 6), but also when compared to external gears subjected to the second process alone (Comparative Examples 1 to 3).

Moreover, achievement of an increase in surface hardness and an increase in compressive residual stress was also confirmed for whichever material was employed for the external gears subject to treatment, namely for SCM435H, SCM440H, and SNCM439.

Each of the external gears subjected to the second process alone (Comparative Examples 1 to 3) moreover had a surface roughness Ra exceeding 0.30 μm, i.e. an Ra of approximately 0.38 μm for Comparative Example 1, an Ra of approximately 0.35 μm for Comparative Example 2, and an Ra of approximately 0.36 μm for Comparative Example 3. By contrast thereto, each of the external gears of Examples 1 to 3 subjected to both the first and second processes had improved surface roughness, with the surface roughness Ra not exceeding 0.3 μm in all cases.

A reduction in operation noise and the achievement of a muffling effect was thus confirmed in a strain wave reduction gear mechanism incorporating an external gear treated using the method of the present invention.

While this disclosure has been written in conjunction with the specific embodiments described above, it is evident that many alternatives, combinations, modifications and variations are apparent to those skilled in the art. Accordingly, the described embodiments of this disclosure, as set forth above are intended to be illustrative only, and not in a limiting sense. Various changes can be made without departing from the spirit and scope of this disclosure. Combinations of the above embodiments and other embodiments will be apparent to those of skill in the art upon studying the above description and are intended to be embraced therein. Therefore, the scope of the present disclosure is defined by the appended claims, and all devices, processes, and methods that come within the meaning of the claims, either literally or by equivalence, are intended to be embraced therein. Furthermore, to the extent that the term "includes" is used in either the detailed description or the claims, such term is intended to be inclusive in a manner similar to the term "comprising" as "comprising" is interpreted when employed as a transitional word in a claim.

DESCRIPTION OF REFERENCE NUMERALS

1 Strain wave reduction gear mechanism
2 Internal gear
3 External gear
4 Strain wave generator
31 Diaphragm
41 Boss
RL Major axis
δ Gap

The invention claimed is:

1. A method of treating a surface of a gear for a strain wave reduction gear mechanism, the method comprising:
taking a gear for a strain wave reduction gear mechanism as an object to be treated, the gear being formed from a machine structural steel containing at least 0.2 mass % carbon and being subjected to heat treatment after having been machined;
performing a first process in which carbide particles with a particle diameter of from 220 grit to 3000 grit particle size are ejected against a surface of the object to be treated at an ejection velocity of at least 50 m/sec or at an ejection pressure of at least 0.1 MPa so as to remove machining marks generated on the surface of the object to be treated during the machining and so as to cause elemental carbon in the carbide particles to diffuse and permeate into the surface of the gear; and
after the first process, performing a second process in which spherical particles are ejected against a surface of the object to be treated at an ejection pressure of at least 0.2 MPa so as to increase an internal compressive residual stress of the gear surface by a magnitude of at least −50 MPa, the spherical particles having a hardness equivalent to or greater than that of the object to be treated and a particle size of not more than 220 grit.

2. The surface treatment method for the gear for a strain wave reduction gear mechanism of claim 1, wherein the carbide particles employed in the first process are formed from SiC or α-SiC.

3. The surface treatment method for the gear for a strain wave reduction gear mechanism of claim 1, wherein the object to be treated is an external gear for a strain wave reduction gear mechanism.

4. The surface treatment method for the gear for a strain wave reduction gear mechanism of claim 1, wherein the machine structural steel contains at least 0.2 mass % carbon, either nickel, chromium, molybdenum or combinations thereof, including SCM435H, SCM440H, and SNCM439.

5. The surface treatment method for the gear for a strain wave reduction gear mechanism of claim 2, wherein the object to be treated is an external gear for a strain wave reduction gear mechanism.

* * * * *